US009323885B2

(12) United States Patent
Koppauer et al.

(10) Patent No.: US 9,323,885 B2
(45) Date of Patent: Apr. 26, 2016

(54) METHOD FOR GENERATING UPDATED VEHICLE WIRING HARNESS DIAGRAMS

(71) Applicant: Bayerische Motoren Werke Aktiengesellschaft, Munich (DE)

(72) Inventors: Josef Koppauer, Munich (DE); Martin Poeschl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 397 days.

(21) Appl. No.: 13/848,946

(22) Filed: Mar. 22, 2013

(65) Prior Publication Data
US 2014/0288886 A1    Sep. 25, 2014

(51) Int. Cl.
*G06F 17/50* (2006.01)

(52) U.S. Cl.
CPC .......... *G06F 17/509* (2013.01); *G06F 17/5009* (2013.01); *G06F 17/5045* (2013.01); *G06F 2217/36* (2013.01)

(58) Field of Classification Search
None
See application file for complete search history.

(56) References Cited

U.S. PATENT DOCUMENTS

| | | | |
|---|---|---|---|
| 2003/0023947 A1* | 1/2003 | Sakakura et al. | 716/17 |
| 2003/0079197 A1* | 4/2003 | Pannala | G06F 17/509 716/102 |
| 2005/0183052 A1* | 8/2005 | Ash-Rafzadeh | 716/8 |
| 2008/0195613 A1* | 8/2008 | Sumi et al. | 707/6 |
| 2008/0307382 A1* | 12/2008 | Holdsworth et al. | 716/12 |
| 2009/0157209 A1* | 6/2009 | Holdsworth | 700/97 |
| 2010/0070243 A1* | 3/2010 | Yvon et al. | 703/1 |
| 2011/0031809 A1* | 2/2011 | Yoshida et al. | 307/42 |
| 2011/0145773 A1* | 6/2011 | Best et al. | 716/112 |
| 2013/0205270 A1* | 8/2013 | Yoshimura | G06F 17/5045 716/102 |
| 2014/0088919 A1* | 3/2014 | Toyama | G06F 17/509 702/181 |
| 2014/0297013 A1* | 10/2014 | Huffine | 700/97 |
| 2014/0303950 A1* | 10/2014 | Houeto | E21B 43/00 703/10 |

OTHER PUBLICATIONS

M. Nirschle, J. Koppauer, "Standardized data models as the basis for an optimized process" 2009, pp. 1-17.*
O. Rabe, "Electrologic Data Exchange for Car Electric Systems", 2006, pp. 1-41.*

* cited by examiner

*Primary Examiner* — Kibrom K Gebresilassie
(74) *Attorney, Agent, or Firm* — Crowell & Moring LLP (57) ABSTRACT

A unique reproducible nomenclature for all components of a wiring harness is provided such that automatic calculation and re-calculation of wiring harness configurations is made possible. Specifically, automated updating of identification tags for harness nodes, bundles, parts from/referring to these topology elements without connectors/connections/cable lugs, as well as accessories referring to connectors, is provided for using a unique reproducible nomenclature and set of predefined rules.

22 Claims, 8 Drawing Sheets

METHOD FOR GENERATING UPDATED VEHICLE WIRING HARNESS DIAGRAMS

FIELD OF THE INVENTION

The present invention relates in general to generating updated vehicle wiring harness diagrams, and more particularly to a novel approach for providing a unique reproducible nomenclature for all components of a wiring harness in order to enable automatic calculation and re-calculation of wiring harness configurations.

BACKGROUND OF THE INVENTION

It is generally known that vehicle wiring harnesses are very complex and cumbersome to modify. Moreover, many modern vehicles provide the driver with the ability to modify the vehicle's electrical functionality, and the added complexity created by this feature has to be incorporated into the design of the vehicle's wiring harness. Further complicating the process of generating and/or modifying vehicle wiring harnesses is the fact that no two vehicles have the same wiring harness configurations.

During harness design and modification, development statuses of wiring harnesses must be manually compared since there is no reproducible nomenclature that can be used to particularly identify the changes made for adaptation of the manufacturing plans. It can take over twelve hours to manually compare two change versions of a wiring harness in order to identify any changes that have been made.

While an open standard referred to as "KBL" has been developed to define automotive electrical wiring harnesses and is being used by a number of manufacturers and their suppliers, the standard IDs assigned by current wiring harness design software tools have a model-specific prefix followed by a sequential number. The result is that, from the vehicle's point of view, the same nodes, bundles, fasteners, wiring protection parts potentially have different IDs on different drawings. Similarly, from the vehicle's point of view, different nodes, bundles, fasteners, wiring protection parts potentially have the same IDs on different drawings. As a result, any electronic analyses, evaluations or comparisons, as well as the uniqueness of definitions (e.g., the routing definition for ring routing), is very complex and laborious.

Wiring harness manufacturers employ a so-called modeling board (FormBrett), where upon the wiring harness is actually produced. This board can be in the form of a 10 to 15 meter long wooden plate containing the paths and the holding fixtures to produce a wiring harness configuration, i.e., a particular wiring harness that will be integrated into a particular vehicle.

When a vehicle manufacturer requires a modification to an existing wiring harness, the wiring harness manufacturer would not typically want to discard its entire modeling board, but would rather prefer to adapt it. However, to accomplish this, the wiring harness manufacturer must know, on a diagram level, exactly what the requested modification consists of. Today, this cannot be calculated electronically given that the vehicle manufacturer's development tools and the wiring harness manufacturer's form board design tools are not readily compatible. Therefore, there is a need to provide a unique reproducible nomenclature for all components of a wiring harness such that automatic calculation and re-calculation of wiring harness configurations is made possible.

BRIEF SUMMARY OF THE INVENTION

Disclosed and claimed herein are computer-implemented methods and computer program products for generating updated vehicle wiring harness diagrams. In one embodiment, the method comprises receiving, by a processor-based computer, a user request to alter vehicle wiring harness data, wherein the vehicle wiring harness data corresponds to a vehicle wiring harness diagram having a plurality of nodes and a corresponding plurality of node identification tags (IDs). The method also includes reassigning, in accordance with at least one predefined rule, the plurality of node IDs corresponding to at least the plurality of nodes altered in response to the user request. In addition, the method includes generating an updated version of the vehicle wiring harness diagram in accordance with the node ID reassignment operation.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview of the Disclosure

One aspect of the disclosure relates to providing a unique reproducible nomenclature for all components of a wiring harness such that automatic calculation and re-calculation of wiring harness configurations is made possible. Specifically, the disclosure provides for the automated update of identification tags (IDs) for harness nodes, bundles, parts from/referring to these topology elements without connectors/connections/cable lugs, as well as accessories referring to connectors.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

References herein to "KBL" refer both to the current "Harness Description List" standard that is known and used in automotive electrical wiring harnesses, as well as to any equivalent naming convention which may be adopted, implemented or otherwise utilized by vehicle manufacturers and/or their suppliers in connection with the field of electrical wiring harness design and manufacture.

DETAILED DESCRIPTION

The present invention relates to the recording of wiring harness configurations with a function that adapts the IDs (KBL::ID) of the individual harness elements, of the element types named in the following, for the wiring harness configuration to be recorded according to a specified diagram. In certain embodiments, this may be done for each of the following harness element types:

Nodes
Connectors
Bundles (segments)
All wiring protection parts that are positioned on a segment (bundle) (using KBL::Protection_area)
All remaining parts that are positioned on a segment (bundle) (using KBL::Fixing_assignment)
All parts except for connectors/connections/cable lugs (KBL::Connector housing), that are referenced by a node, e.g. fasteners (e.g., spools or branching parts) and assemblies
All connector-referenced accessories As used herein, the term "bundle" (also referred to as a "segment") is a section of a topological connection where no intermediate electrical contacts appear. In other words, at the beginning and at the end, the same wires go in and out. Cables and wires are divided in bundles. Every bundle has its own characteristics, such as length, temperature range, etc.

The principles of the invention can be used to simplify the routing definition for alternative topology paths with the advantages of higher data quality, especially for updates. Moreover, the invention makes possible the distribution of a wiring harness topology definition over several drawings with the advantage of simplified change management. Finally, principles of the invention make possible comparisons across product lines.

The principles of the invention may be carried out using a wiring harness drawing authoring software tool, such as the commercially available product LDorado Design, CATIA wiring or Zuken e3.topology. It should be appreciated that such an authoring tool that is configured to carry out one or more aspects of the invention may be executed on one or more processor-based computers, servers, databases and any combinations thereof. According to a first embodiment of the functions to be carried out by the authoring tool, all IDs of all named elements may be reassigned. According to a second embodiment of the functions, only the IDs of newly-added nodes will be reassigned and, building on this, the IDs of the other named elements.

Figure 1:
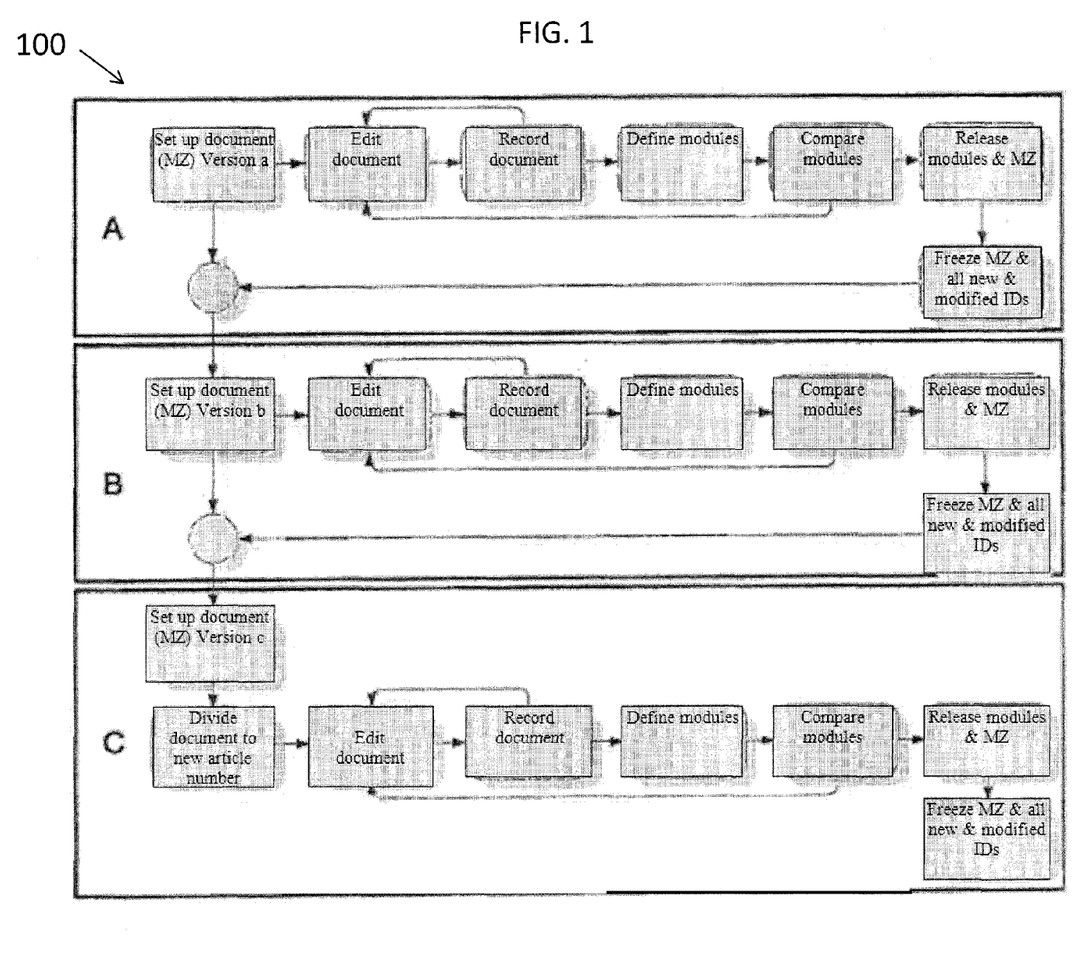
FIG. 1 depicts a simplified flow diagram of how one or more aspects of the invention may be carried out using a wiring harness drawing authoring software tool.

Referring now to FIG. 1, depicted is a simplified flow diagram 100 of how one or more aspects of the invention may be carried out using a wiring harness drawing authoring software tool. With respect to Section A of FIG. 1 and in accordance with the first embodiment mentioned above, when recording a dimensional drawing of a vehicle wiring harness in its 'Version a,' in contrast to the prior art, all IDs of the harness' elements (e.g., nodes, bundles, wiring protection parts, etc.) are reassigned according to a set of predetermined rules, as will be detailed below, and saved with the dimensional drawing.

Also, in accordance with the first embodiment, if the 'Version a' of the dimensional drawing is changed and recorded again, however, the IDs already assigned would be deleted, and all IDs reassigned and saved with the dimensional drawing. During the comparison operation, these IDs may also be transferred over into the corresponding module's KBLs in the attribute "ID" of the respective objects.

It may also be preferable to reset, after each new recording, all wiring harness modules of the dimensional drawing (e.g., to a status of "new comparison required") in order to ensure that after each change of the IDs on a dimensional drawing, such IDs must also be transferred over into the KBL.

During release and freezing of the drawing and its dependent modules, the IDs assigned at this time are also frozen, i.e., locked or otherwise made unavailable for additional modification.

Now, with respect to Section B of FIG. 1, if additional versions are made of a frozen dimensional drawing, they can be edited by the user. However, IDs assigned in a previous version and frozen should preferably not be editable by the user. In view of this, in wiring harness software author tool of the present invention, the field element ID may be blocked in the standard characteristic dialogs for the some or all of the wiring harness elements.

In addition, it is also preferable to ensure that an ID (for example one that has been frozen) is not assigned in duplicate. Therefore, in contrast to prior art authoring tools, during a copy-paste operation the element IDs are always assigned as new elements. As such, any input of an alias ID and passing on of the element ID for connectors/connections/cable lugs should be limited, i.e. not to be used for parts list parts.

After recording a dimensional harness drawing of this type, the element IDs may be assigned in accordance with the above-referenced second embodiment, i.e., reassignment of the IDs for the new nodes to be added in comparison to the previous version of the dimensional drawing, and building on that, of the IDs of the other elements named. If the dimensional drawing is edited and recorded (either before or after one or more module comparisons are performed), the same principle may be used: the element IDs are assigned according to the second embodiment.

During comparison operations, the above IDs may be transferred over into the corresponding module KBLs in the "ID" attribute of the respective objects. During release and freezing of the drawing and its dependent modules, the IDs assigned at that time may again be frozen.

Referring now to Section C of FIG. 1, if a version of a dimensional drawing is separated to a new article number, the document to be created in this way may be treated like a new version of the original dimensional drawing, as described above with respect to the description of Section B.

It should further be appreciated that, in order to be able to use the element IDs for the machine comparison of dimensional drawings and modules, new versions or documents in the life cycle of a dimensional drawing may only be created for the particular authoring function described herein.

In each of the first and second embodiment, it may also be preferable to verify that a particular drawing satisfies each of the following prerequisites:
  The dimensional drawing to be considered contains no nodes or a completely closed topology, i.e. each node can be reached from any other node using at least one path along the defined segments.
  At least one instance of a connector/connection/cable lug is positioned.
  No two instances of a connector/connection/cable lug have the same short name (Alias_ID. Reason: there is a check and assignment of a duplicate ID is prevented. If two identical designations exist, which undoubtedly represents an error, a number of highly degenerative IDs result).
  Line protection parts are not positioned across segments (cannot be defined with the current version of LD Design anyway).

If there is a violation of one of these prerequisites, the user may receive an error message.

Figure 2:
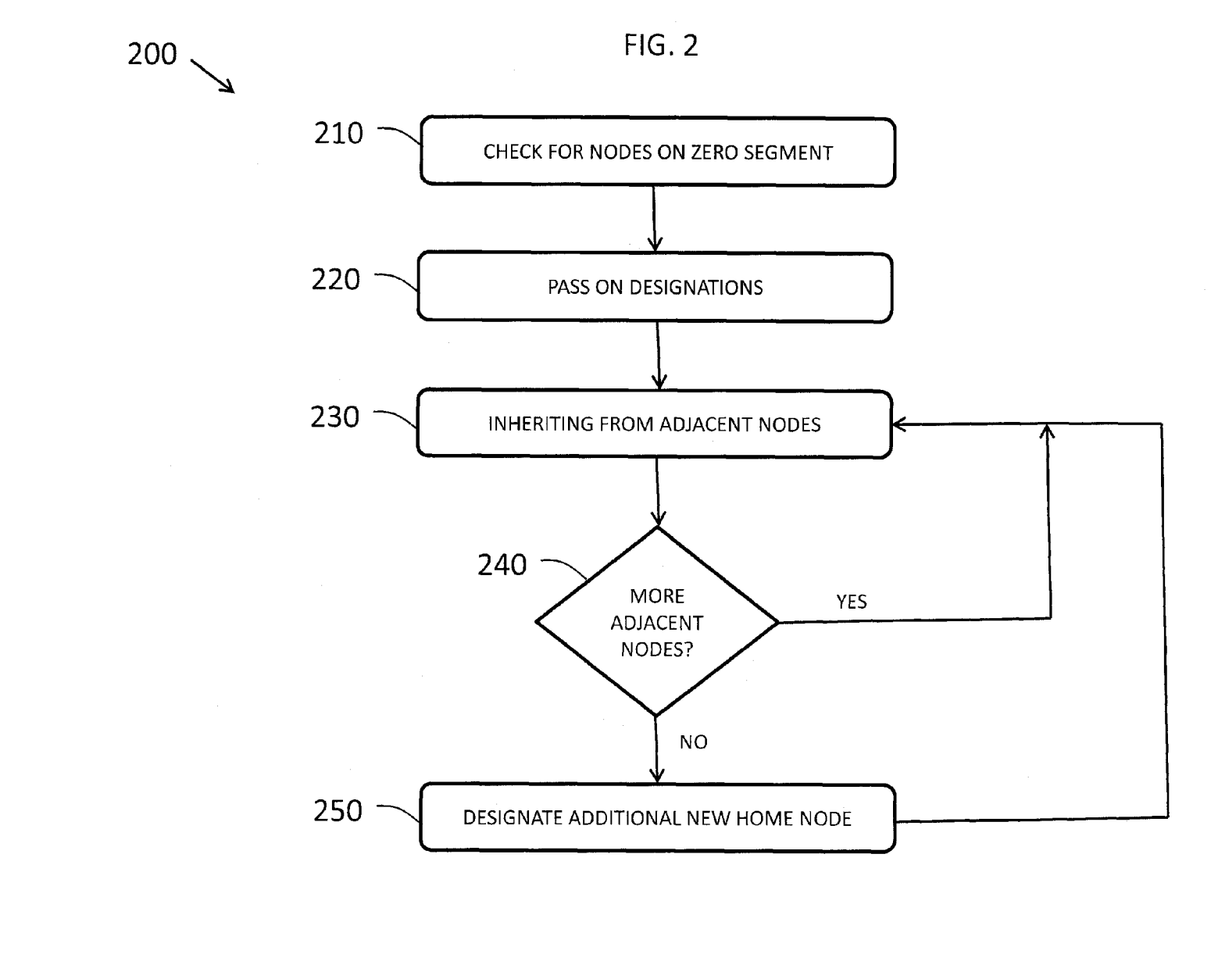
FIG. 2 depicts an exemplary process for how the node IDs may be reassigned in accordance with the principles of the invention.

With reference now to FIG. 2, one process for how the node IDs may be reassigned will now be described. It should be noted that 'KZ' will refer to the quantity of all nodes defined on a drawing, while 'KU' will refer to the quantity of nodes with IDs that have to be adjusted. In the first embodiment (update of all IDs), KU is equal to KZ. In the second embodiment (reassignment of the IDs only for the newly added nodes and building on the IDs of the other elements named), KZ would only contain the nodes whose current ID has not already been assigned by a previous run of the authoring software tool.

Process 200 may begin at block 210 with a determination as to whether nodes from KU lie on zero segments, which are segments having a length equal to zero, which sometimes exist in wiring harness drawings. If this is the case, it may be determined whether any of such nodes is a home node, whether in the quantity of nodes that can only be reached using zero segments, one or more nodes exist that are not included in KU.

If there are nodes having the same node ID, this ID can also be transferred over for the home node considered and the nodes then removed from KU. If two or more of these nodes have different IDs, there is an error and the process may be terminated for violation of one of the prerequisites identified above.

Continuing to describe the reassignment process 200 of FIG. 2, at block 220 nodes from KU, on which a connector/connection/cable lug was positioned, may pass on their short names (KBL::Alias-ID)—if defined—otherwise its element ID. In a case where several connectors/connections/cable lugs are positioned on the node considered, the node may pass on the ID from the connector/connection/cable lug whose short name has the smallest value and/or if not present, the element ID of which has the lowest value in the alphabetical sorting. It may be preferable to add a prefix, such as "#K:". Also, a postfix, such as the character sequence "_0", may also be appended. Each node with an ID adjusted according to the process described may preferably be removed from KU. Below are two examples of the reassignment operation, which are graphically illustrated in FIG. 3:

Example 1

Figure 3:
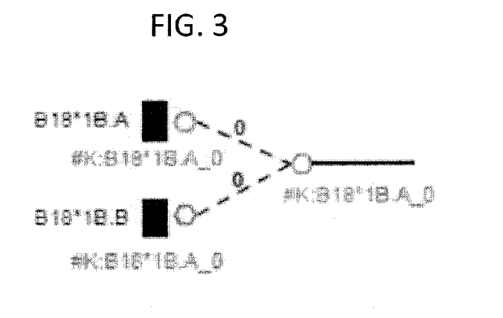
FIG. 3 graphically depicts an example of a wiring harness node ID reassignment operation carried out in accordance with the principles of the invention.

Connector: element ID: B18*1B
Connector: short name: B18*1B.A
Resulting node ID (element ID): #K:B18*1B.A_0

Example 2

Connector 1: element ID: B18*1B
Connector 1: short name: B18*1B.B
Connector 2: element ID: B18*1B
Connector 2: short name: B18*1B.A
Resulting node ID (element ID): #K:B18*1B.A_0

In a case where a node that will receive a node ID (element ID), is the end point of one or more zero segments, the node ID may be passed only onto other nodes that can be reached exclusively via zero segments. The affected nodes may be removed from KU. It should further be appreciated that since the assignment process is performed in alphanumeric ascending sequence of designations, even the special case where different designations are placed on nodes of a chain of zero segments will be handled correctly and, in fact, analogously to Example 2 above.

It should further be appreciated that, while the present disclosure uses the following ID prefix nomenclature, any other pre-defined prefix nomenclature may be similarly used in connection with the principles of the invention:
  #K: Nodes,
  #B: Bundles,
  #L: Wiring protection (coil, tube, hose), and
  #T: all other parts except for connectors/connections/cable lugs.

Referring now back to FIG. 2, block 230 represents another aspect of the ID reassignment process 200, which is to inherit designation from adjacent nodes that are contained in KU. Specifically, nodes may pass on the ID from a specific home node in accordance with the various examples outlined below, where home nodes are presented as squares and considered adjacent nodes as circles. The common identifier is that the postfix is depicted as being incremented by one (thus to _1 in comparison to the passed on designations of block 220). According to certain embodiments, each node with an ID that is adjusted according to process 200 would be correspondingly removed from KU.

Figure 4A:
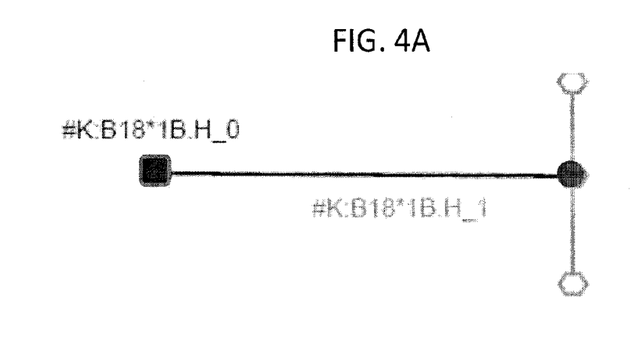
FIGS. 4A-4F are graphically depicted examples of how node IDs can be inherited in a manner consistent with the principles of the invention.
Figure 4B:
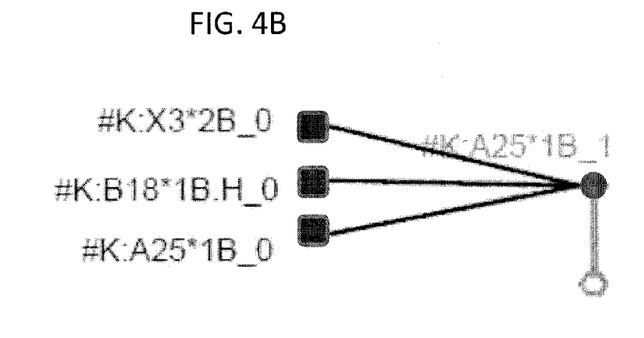
Figure 4C:
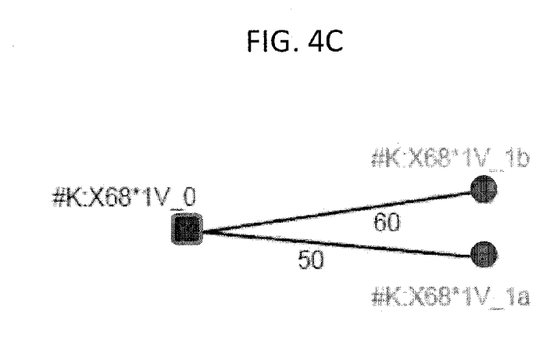

With respect to FIGS. 4A-4D, depicted therein are graphical representations of examples of the operation of block 230. For example, FIG. 4A depicts a simple example of passing on the ID of the adjacent node. FIG. 4B illustrates the passing on the smallest ID (alphabetic sorting, letters also considered) of the adjacent node under consideration.

Figure 4D:
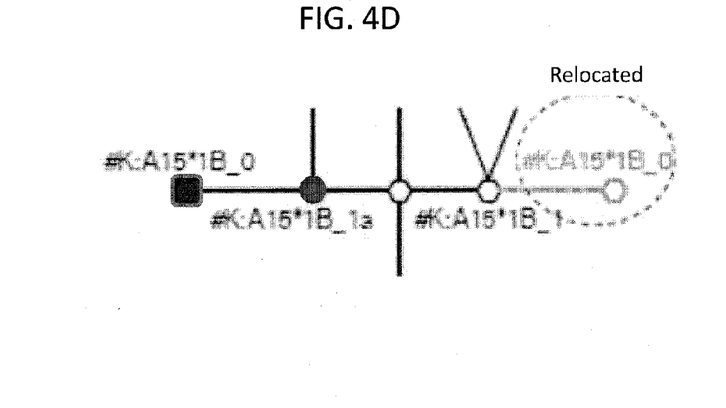

In addition, it may also be necessary to resolve ambiguous designations and/or prevent the duplicate of ID assignment by the assignment of some additional postfix, for example "a," "b," "c," etc. in ascending sequence of the bundle lengths. By way of example and with reference to FIG. 4C, if bundle lengths are the same, sorting may occur in the sequence of the object IDs. FIG. 4D, on the other hand, shows how the principles of the invention may be used to avoid ambiguity (and/or risk of duplicate ID assignment in the result) due to replacement of one or more designations (e.g., because of transfer of an entire pickup) in combination with execution of the function according to the second embodiment described above. In the example, it is assumed that #K:A15*1B_1 is included in the quantity KZ, but not in the quantity KU. If #K:A15*1B_1 would be included in the quantity KU, the procedure would be according to the standard case. The risk of a duplicate ID assignment would not exist since #K:A15*1B_1 would be assigned another ID at a later time.

Figure 4E:
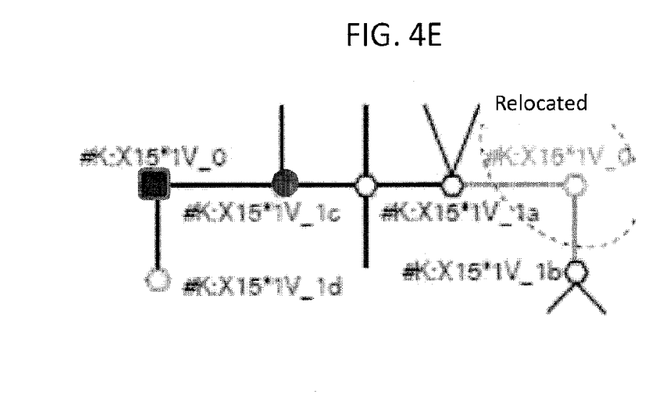

FIG. 4E depicts how the principles of the invention may be used to avoid ambiguity (and/or risk of duplicate ID assignment in the result) based on relocation of one or more designations, also in combination with execution of the function according to the second embodiment described above. If in the case of #K:X15*1V_0 there is only one adjacent node, #K:X15*1V_1 would be permissible. The sequence of prefixes "c" and "d" may be selected as specified above. Moreover, the risk of a duplicate ID assignment in the result may be eliminated by appending, and if necessary continuing to increment a postfix, until a postfix is found that leads to an ID without a corresponding risk.

Figure 4F:
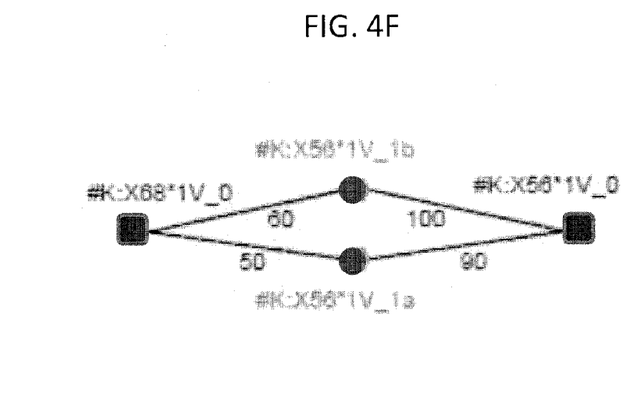

FIG. 4F depicts another example which determines how IDs are assigned in case of a simultaneous occurrence of the case described above with reference to FIG. 4B and the case described above with reference to FIG. 4C.

It should further be appreciated that, in a case where a node that will get a node ID (element ID) is an end point of one or more zero segments, the node ID may be passed on to all other nodes that can be reached exclusively via zero segments. As noted above, the related nodes would then preferably be removed from the KU.

Referring now back to FIG. 2, the operation of block 230 is preferably carried out in a repeated manner analogously, whereby during each loop run, the previously considered adjacent node represents the new home node to be considered. At block 240, the loop back to block 230 is executed until the home nodes considered contain no more adjacent nodes that are contained in KU.

In some cases, as noted above, nodes may be assigned a letter in addition to a number as a postfix. If this type of ID is to be passed on to adjacent node, only the number of the postfix need be incremented, not the letter.

Once it is determined at block 240 that there are no additional adjacent nodes, process 200 may continue to block 250 where any nodes from KZ that are adjacent to but not contained within KU may be processed. In particular, according to certain embodiments one node out of this set of leftover nodes may be designated as a new home node. It may be preferable to select the node having the lowest postfix number as a first selection criterion and the lowest ID (letters also included) as a second selection criterion. Once the new node is selected at block 250, process 200 may revert to block 230 and proceed in an analogous fashion as previously described above with respect to blocks 230 and 240, with one potential modification. Specifically, instead of incrementing the postfix number, an additional postfix "A" may be appended to the ID, thereby further ensuring uniqueness.

While the preceding discussion set forth the reassignment operation for wiring harness nodes, the present disclosure further envisions that wiring harness bundle IDs will be similarly reassigned as part of the wiring harness drawing authoring software tool and the functions it performs, as described above with respect to FIG. 1. Specifically, wiring harness bundles receive their new bundle IDs following the above update of the node IDs. Each bundle derives its ID from the IDs of the two nodes that connect it. In the following, these two nodes are designated as adjacent nodes. A prefix "#K:" that may be present need not be considered in this process. When a part is placed on a node then the node-ID and the part-ID should be different in order to ensure that IDs are globally unique. This can be accomplished using different prefixes.

In certain embodiments, the two node IDs to be passed on are separated with the separator "/" The ID (without prefix "#K:") of the adjacent node having the smallest postfix number, as a first selection criterion, and the lowest ID (letters also included) as a second selection criterion, may be set at the position to the left of the separator, with the ID (without prefix "#K:") of the other adjacent node being set to the right of the separator. Finally, the new bundle ID may further be provided with a separate prefix "#B:".

Figure 5A:
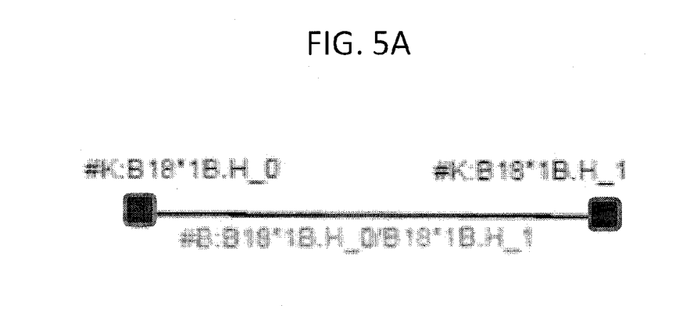
FIGS. 5A-5C graphically depict examples of a wiring harness bundle ID reassignment operation carried out in accordance with the principles of the invention.
Figure 5B:
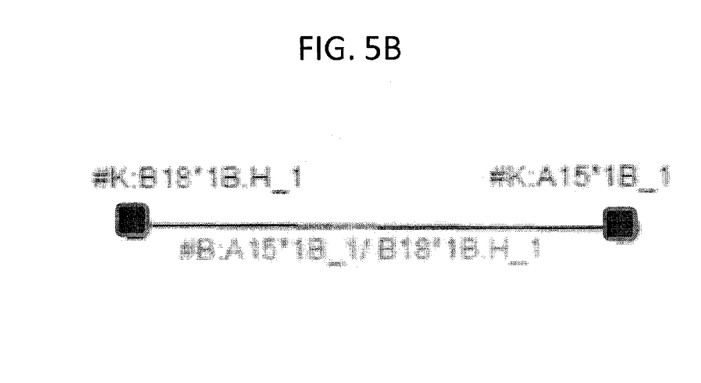
Figure 5C:
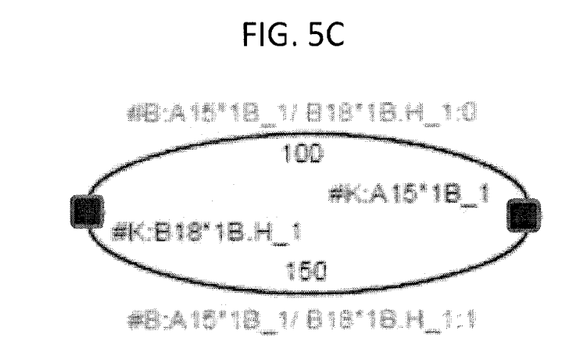
Figure 6A:
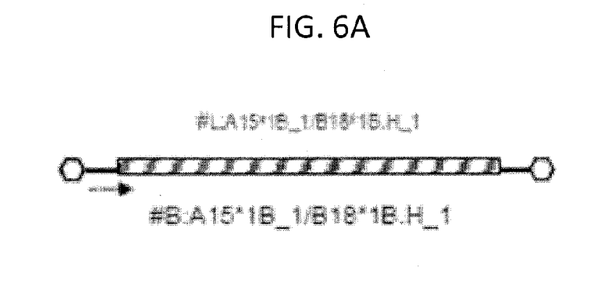
FIGS. 6A-6D graphically depict examples of a wire protection part ID reassignment operation carried out in accordance with the principles of the invention.
Figure 6B:
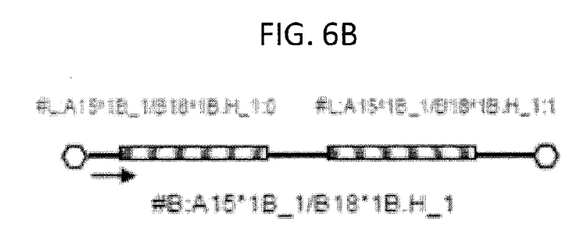
Figure 6C:
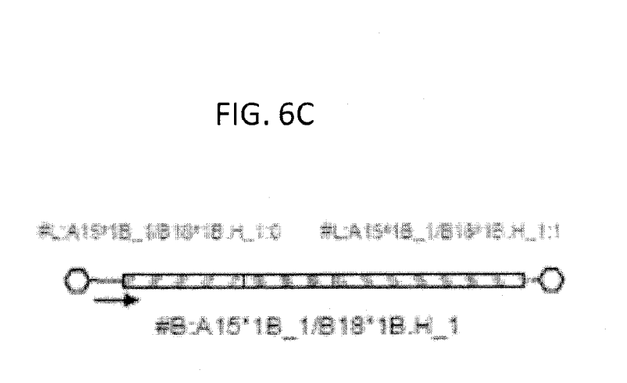
Figure 6D:
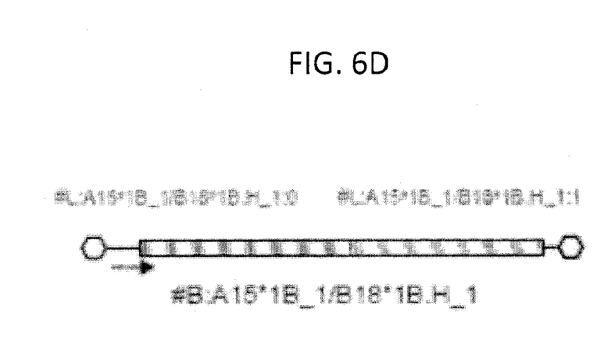

Therefore, a postfix need be appended only if two or more bundles connect the same two nodes and in this case also only for the respective bundle affected. In this example, the symbol ":" is followed by a serial number starting with 0 for each tuple considered. The sequence may be based on ascending bundle length. For bundle lengths that are the same, the sequence may not be specified for these elements. Three examples of the bundle ID reassignment process are illustrated in FIGS. 5A-5C.

In addition to reassignment of node and bundle IDs, another aspect of the invention is to further provide for the reassignment of the IDs of wire protection parts that are positioned along a segment (bundle). Specifically, wire protection parts (KBL::Wire_protection_occurrence) that are positioned on a segment (KBL::Protection_area) may receive their wire protection part IDs following the assignment of the bundle ID. In certain embodiment, each wiring protection part derives its new ID from the respective bundle on which it is placed. A prefix "#B:" that may be present need not be considered here. Instead, a separate prefix "#L" may be added.

A postfix may be appended only if two or more wire protection parts are positioned on the same bundle, and in that case, need be appended only for the respective affected wiring protection parts. In this case, the symbol ":" may be followed by a sequential number starting with 0 for each bundle. The sequential number may be determined by using the distance of the starting point from the starting point of the bundle in ascending sequence, as the first selection criterion, and by using the distance of the end point, also from the starting point of the bundle in ascending sequence, as the second selection criterion. Additionally, as a third selection criterion, the article number of the affected wiring protection parts in ascending sequence may be used. Finally, a tool-internal object ID may be used as a fourth selection criterion, which is an ID correspond to a data object in memory corresponding to a wiring harness element (e.g., GUUD). Four examples of the reassignment of the IDs of wire protection parts are illustrated in FIGS. 6A-6D.

Once the above process of reassigning IDs for all nodes, bundles and wiring protection parts have been completed, any remaining parts that may be positioned on a segment (bundle) (via KBL::Fixing_assignment) may be similarly reassigned. In certain embodiments, any remaining parts (KBL::Fixing_occurrence and KBL::Accessory_occurrence) that are positioned on one segment (per KBL::Fixing_assignment) may receive a part ID that is a derivation of the respective ID occurs analogously to the procedure described above with respect to the wiring protection parts. However, "#T:" may be used as a prefix—for fasteners and/or accessory parts.

Moreover, in the case of remaining parts, a postfix may only be appended if two or more parts (fasteners and accessories may be considered in common) are positioned on the same bundle and in this case, also only for the respective affected parts. In this case, the sign ":" followed by a sequential number starting with 0 for each bundle may be appended. The sequential number may be determined by the following selection criteria:
- as the first selection criterion, using the distance of the starting point from the starting point of the bundle in ascending sequence;
- as the second selection criterion, using the article number of the affected wiring protection parts in ascending sequence; and
- as the third selection criterion, the tool-internal object ID.

Figure 7A:
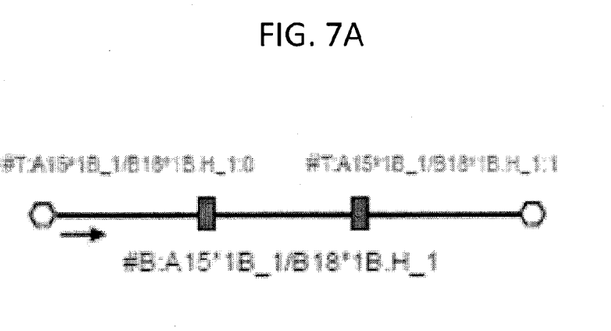
FIGS. 7A-7B graphically depict examples of a reassignment operation for additional wiring harness parts carried out in accordance with the principles of the invention.
Figure 7B:
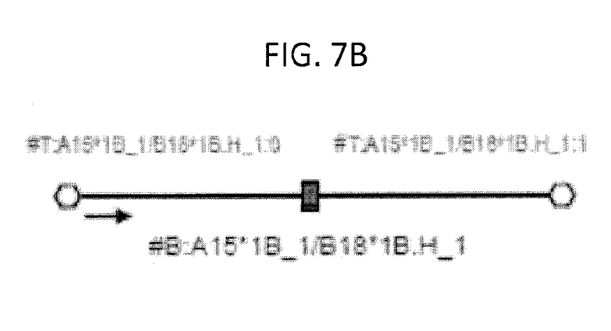

Two examples of the ID reassignment process for such remaining parts are illustrated in FIGS. 7A-7B. Note the assignment of the post-fix ":0" to ":1" in the sequence of article numbers.

All accessory parts that reference one or more connectors/connections/cable lugs may receive their part IDs from the respective node on which it is placed. If a part is positioned on several nodes simultaneously, the part may inherit from all such node IDs (without prefix "K:") in ascending alphabetic sequence. The node IDs may be separated by the separator "1". In the case described above, "#T:" is used as prefix. Moreover, a postfix may only be appended if, without consideration of connectors/connections/cable lugs, two or more parts have the same node assignment. In this case, the symbol ":" may be appended, followed by sequential numbers starting at 0 for each node. The sequential number may be determined by the following selection criteria:
- as the first selection criterion, using the article number of the affected parts in ascending sequence; and
- as the second selection criterion, using the tool-internal object ID.

Figure 8A:
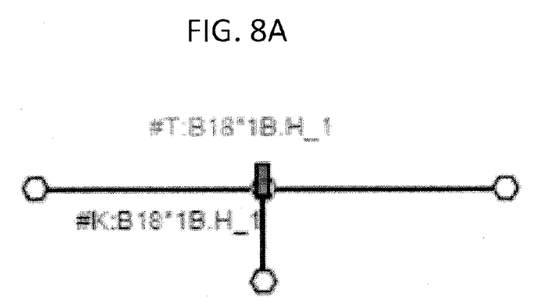
FIGS. 8A-8B graphically depict examples of a reassignment operation for accessory parts carried out in accordance with the principles of the invention.
Figure 8B:
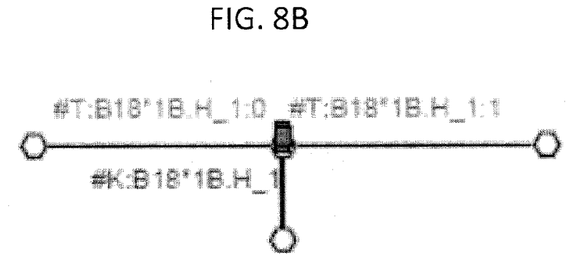

Two examples of the ID reassignment process for such accessory parts are illustrated in FIGS. 8A-8B. Note the assignment of the post-fix ":0" to ":1" in the sequence of article numbers.

While accessory parts that reference one or more connectors/connections/cable lugs receive their part IDs following the process described above and exemplified in FIGS. 8A-8B, accessory parts that are simultaneously assigned to one node and reference one or more connectors/connections/cable lugs ultimately derive their ID from the respective connector/connection/cable lug(s) that it references.

It should be appreciated that the above process for the reassignment of vehicle wiring harness components allows design changes and comparisons to be made in an efficient and automated fashion, even across product lines. This is made possible, at least in part, by virtue of the fact that design changes (e.g., deletion of nodes/bundles and subsequent new system) components which are not removed or altered will be assigned the same ID as before, thereby dramatically simplifying the design and manufacture process, including the process of communicating design changes to vendors.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A computer-implement method for generating updated vehicle wiring harness diagrams comprising the acts of:
   receiving, by a processor-based computer, a user request to alter vehicle wiring harness data, wherein the vehicle wiring harness data corresponds to a vehicle wiring harness diagram having a plurality of nodes and a corresponding plurality of node identification tags (IDs);
   reassigning, by the processor-based computer and in accordance with at least one predefined rule, the plurality of node IDs corresponding to at least the plurality of nodes altered in response to the user request; and
   generating, by the processor-based computer, an updated version of said vehicle wiring harness diagram in accordance with said node ID reassigning.

2. The computer-implement method of claim 1, wherein each of the plurality of nodes in the updated version of said vehicle wiring harness diagram corresponds to a unique node ID.

3. The computer-implement method of claim 1, wherein the vehicle wiring harness diagram further comprises a plurality of bundles and a corresponding plurality of bundle IDs.

4. The computer-implement method of claim 3, wherein the method further comprises reassigning, by the processor-based computer and in accordance with the at least one predefined rule, the plurality of bundle IDs corresponding to at least the plurality of bundles altered in response to the user request, and wherein said generating further comprises generating, by the processor-based computer, the updated version of said vehicle wiring harness diagram in further accordance with said bundle ID reassigning.

5. The computer-implement method of claim 3, wherein each of the plurality of nodes in the updated version of said vehicle wiring harness diagram corresponds to a unique bundle ID.

6. The computer-implement method of claim 3, wherein the vehicle wiring harness diagram further comprises a plurality of wiring protection parts and a corresponding plurality of wiring protection part IDs.

7. The computer-implement method of claim 6, wherein the method further comprises reassigning, by the processor-based computer and in accordance with the at least one predefined rule, the plurality of wiring protection part IDs corresponding to at least the plurality of wiring protection parts altered in response to the user request, and wherein said generating further comprises generating, by the processor-based computer, the updated version of said vehicle wiring harness diagram in further accordance with said wiring protection part ID reassigning.

8. The computer-implement method of claim 1, wherein each of the plurality of nodes in the updated version of said vehicle wiring harness diagram corresponds to a unique wiring protection part ID.

9. The computer-implement method of claim 1, wherein the at least one predefined rule comprises passing on node IDs from at least one of the plurality of nodes that is on a zero segment of the vehicle wiring harness diagram.

10. The computer-implement method of claim 1, wherein the at least one predefined rule comprises inheriting node IDs from an adjacent one of the plurality of nodes.

11. A computer program product, comprising:
 a non-transitory processor readable medium having processor executable code embodied therein to provide voice interaction in a vehicle, the processor readable medium having:
 processor executable program code to receive a user request to alter vehicle wiring harness data, wherein the vehicle wiring harness data corresponds to a vehicle wiring harness diagram having a plurality of nodes and a corresponding plurality of node identification tags (IDs),
 processor executable program code to reassign, in accordance with at least one predefined rule, the plurality of node IDs corresponding to at least the plurality of nodes altered in response to the user request, and
 processor executable program code to generate an updated version of said vehicle wiring harness diagram in accordance with said node ID reassigning.

12. The computer program product of claim 11, wherein each of the plurality of nodes in the updated version of said vehicle wiring harness diagram corresponds to a unique node ID.

13. The computer program product of claim 11, wherein the vehicle wiring harness diagram further comprises a plurality of bundles and a corresponding plurality of bundle IDs.

14. The computer program product of claim 13, wherein the processor readable medium further comprises processor executable program code to reassign, in accordance with the at least one predefined rule, the plurality of bundle IDs corresponding to at least the plurality of bundles altered in response to the user request, and wherein the processor executable program code to generate further comprises processor executable program code to generate the updated version of said vehicle wiring harness diagram in further accordance with said bundle ID reassigning.

15. The computer program product of claim 13, wherein each of the plurality of nodes in the updated version of said vehicle wiring harness diagram corresponds to a unique bundle ID.

16. The computer program product of claim 13, wherein the vehicle wiring harness diagram further comprises a plurality of wiring protection parts and a corresponding plurality of wiring protection part IDs.

17. The computer program product of claim 16, wherein the processor readable medium further comprises processor executable program code to reassign, in accordance with the at least one predefined rule, the plurality of wiring protection part IDs corresponding to at least the plurality of wiring protection parts altered in response to the user request, and wherein said processor executable program code to generate further comprises processor executable program code to generate the updated version of said vehicle wiring harness diagram in further accordance with said wiring protection part ID reassigning.

18. The computer program product of claim 11, wherein each of the plurality of nodes in the updated version of said vehicle wiring harness diagram corresponds to a unique wiring protection part ID.

19. The computer program product of claim 11, wherein the at least one predefined rule comprises passing on node IDs from at least one of the plurality of nodes that is on a zero segment of the vehicle wiring harness diagram.

20. The computer program product of claim 11, wherein the at least one predefined rule comprises inheriting node IDs from an adjacent one of the plurality of nodes.

21. The computer-implement method of claim 1, wherein reassigning the plurality of node IDs comprises reassigning one or more node IDs that are not user modifiable.

22. The computer program product of claim 11, wherein the processor executable program code to reassign the plurality of node IDs comprises processor executable program code to reassign one or more node IDs that are not user modifiable.

* * * * *